(12) United States Patent
Hagström et al.

(10) Patent No.: US 12,162,436 B2
(45) Date of Patent: Dec. 10, 2024

(54) FOLDABLE ATTACHMENT SYSTEM AND A VEHICLE COMPRISING A FOLDABLE ATTACHMENT SYSTEM

(71) Applicant: Ningbo Geely Automobile Research & Development Co., Ltd., Ningbo (CN)

(72) Inventors: Albin Hagström, Lödöse (SE); Jonathan Johansson, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 286 days.

(21) Appl. No.: 17/738,683

(22) Filed: May 6, 2022

(65) Prior Publication Data

US 2022/0258673 A1 Aug. 18, 2022

Related U.S. Application Data

(63) Continuation of application No. PCT/CN2020/129056, filed on Nov. 16, 2020.

(30) Foreign Application Priority Data

Nov. 21, 2019 (EP) .................................. 19210598

(51) Int. Cl.
*B60R 5/04* (2006.01)
*B60R 7/02* (2006.01)
(Continued)

(52) U.S. Cl.
CPC .................. *B60R 5/04* (2013.01); *B60R 7/02* (2013.01); *B60R 7/08* (2013.01); *B60R 2011/0036* (2013.01)

(58) Field of Classification Search
CPC .... B60R 7/02; B60R 7/08; B60R 7/10; B60R 5/04; B60R 2011/0029; B60R 2011/0036; B60R 2011/0082; B60R 2011/0092
See application file for complete search history.

(56) References Cited

U.S. PATENT DOCUMENTS 5,137,158 A * 8/1992 Brockway ................ B60R 7/02
  211/DIG. 1
5,207,260 A * 5/1993 Commesso .......... B61D 45/006
  296/37.16

(Continued)

FOREIGN PATENT DOCUMENTS

CN    205819078 U    12/2016
CN    107031516 A    8/2017
(Continued)

OTHER PUBLICATIONS

Computer translation of WO 2019074010 (Year: 2019).*
(Continued)

*Primary Examiner* — Gregory A Blankenship
(74) *Attorney, Agent, or Firm* — Tucker Ellis LLP (57) ABSTRACT

A foldable attachment system arranged for holding objects within an interior vehicle luggage compartment. The attachment system includes an attachment post, an elongated guide member, and a hook structure, where the hook structure is connected to the attachment post. A first end of the attachment post is slidingly and hingedly connected to the elongated guide member, and the elongated guide member is configured to be connected to a first vehicle interior structure. The attachment post and the hook structure are movably arranged in relation to the elongated guide member between a storage position and an in-use position.

12 Claims, 9 Drawing Sheets

(51) Int. Cl.
 *B60R 7/08* (2006.01)
 *B60R 11/00* (2006.01)

(56) References Cited

U.S. PATENT DOCUMENTS

| | | | |
|---|---|---|---|
| 5,226,569 A | 7/1993 | Watjer | |
| 5,567,107 A | 10/1996 | Bruno | |
| 5,667,120 A * | 9/1997 | Bieck | B60R 7/02 224/501 |
| 6,041,945 A | 3/2000 | Faraj | |
| 6,050,763 A | 4/2000 | Swailes | |
| 6,547,507 B1 | 4/2003 | Gest | |
| 11,794,657 B2 * | 10/2023 | Johansson | B60R 7/02 |
| 2007/0095989 A1 * | 5/2007 | Spater | B60R 7/02 248/95 |
| 2009/0195006 A1 | 8/2009 | Lim | |
| 2010/0090502 A1 * | 4/2010 | Mercurio | B60R 13/013 296/193.07 |
| 2010/0140425 A1 * | 6/2010 | Kallman | F16M 11/10 248/157 |
| 2015/0165979 A1 * | 6/2015 | Huebner | B60R 5/04 296/37.5 |
| 2016/0023586 A1 | 1/2016 | Potticary | |
| 2016/0272121 A1 * | 9/2016 | Nuako | B60R 7/043 |
| 2016/0332580 A1 | 11/2016 | Nouri | |
| 2019/0161020 A1 | 5/2019 | Villacres Mesias | |
| 2019/0256008 A1 * | 8/2019 | Rustwick | B62D 33/0207 |
| 2021/0009043 A1 * | 1/2021 | Dragan | B60R 7/04 |
| 2021/0122297 A1 * | 4/2021 | Gutierrez Cabrera | B60R 7/005 |
| 2021/0229602 A1 * | 7/2021 | Martin, IV | B60R 7/10 |
| 2022/0024386 A1 * | 1/2022 | Johansson | B60R 5/047 |
| 2022/0134960 A1 * | 5/2022 | Durkin | B60R 5/04 224/543 |
| 2022/0134961 A1 * | 5/2022 | Gwinn | B60R 9/08 211/70.8 |
| 2022/0258673 A1 * | 8/2022 | Hagstrom et al. | B60R 5/04 |
| 2023/0108489 A1 * | 4/2023 | Williams | B60J 7/141 296/100.09 |

FOREIGN PATENT DOCUMENTS

| | | |
|---|---|---|
| CN | 108146353 A | 6/2018 |
| CN | 109398241 A | 3/2019 |
| CN | 209426675 U | 9/2019 |
| DE | 102013011124 A1 | 1/2015 |
| EP | 2463225 A1 | 6/2012 |
| WO | WO-2019074010 A1 * | 4/2019 ............... B60R 7/04 |

OTHER PUBLICATIONS

International Search Report from corresponding International Application No. PCT/CN2020/129056, mailed on Feb. 19, 2021, 2 pages.

* cited by examiner

FOLDABLE ATTACHMENT SYSTEM AND A VEHICLE COMPRISING A FOLDABLE ATTACHMENT SYSTEM

RELATED APPLICATION DATA

This application is a continuation of International Patent Application No. PCT/CN2020/129056, filed Nov. 16, 2020, which claims the benefit of European Patent Application No. 19210598.9, filed Nov. 21, 2019, the disclosures of which are incorporated herein by reference in their entireties.

TECHNICAL FIELD

The present disclosure relates to a foldable attachment system arranged for holding objects within an interior vehicle luggage compartment, where the attachment system comprises an attachment post and a hook structure connected to the attachment post. The disclosure further relates to a vehicle comprising a foldable attachment system.

BACKGROUND

Attachment systems are commonly used for holding or securing objects within an interior vehicle luggage compartment. The attachment systems may be provided with hooks or similar structures and are suitable when transporting objects, such as for example grocery bags and other types of bags or storage devices in the luggage compartment for increased convenience and safety during transport. The attachment systems are providing a way to prevent the objects attached to the hooks or similar structures from tipping over when stored and transported in the luggage compartment of the vehicle. Attachment systems with hooks, or similar structures, are commonly designed as constructions that are installed removably or permanently in the luggage compartment area. Such traditional systems are often difficult to use for a convenient transportation of the objects. Even if attachment systems are installed as removable systems, they are often complex and time consuming to attach to and remove from the vehicle.

There is thus a need for an improved vehicle attachment system that is efficiently holding objects in the luggage compartment, where the system is simple to use, and attach to and remove from the vehicle luggage compartment, and further has a simple construction.

SUMMARY

An object of the present disclosure is to provide a foldable attachment system and a vehicle comprising a foldable attachment system where the previously mentioned problems are avoided.

The disclosure concerns a foldable attachment system arranged for holding objects within an interior vehicle luggage compartment. The attachment system comprises an attachment post, an elongated guide member, and a hook structure, where the hook structure is connected to the attachment post. A first end of the attachment post is slidingly and hingedly connected to the elongated guide member, and the elongated guide member is configured to be connected to a first vehicle interior structure. The attachment post and the hook structure are movably arranged in relation to the elongated guide member between a storage position and an in-use position.

Advantages with these features are that with this construction of the foldable attachment system a flexible and compact solution is achieved, where the system can be constructed with low weight. Further, the system with a slidably arranged attachment post is providing a solution that is simple to attach to and remove from the vehicle luggage compartment. The attachment system is simple to use and reliable in construction, and arranged for efficiently holding objects. The attachment system is providing a way to prevent the objects attached to the hooks or similar structures from tipping over when stored and transported in the luggage compartment of the vehicle. The system is simple to attach to and remove from the vehicle luggage compartment through the movable arrangement, and further has a simple construction.

According to an aspect of the disclosure, the hook structure comprises a base structure and one or more hooks arranged on the base structure. The base structure is connected to the attachment post. The hook structure is securely holding the objects during transport and the base structure is used for holding the one or more hooks in relation to the attachment post.

According to another aspect of the disclosure, the one or more hooks are foldably arranged on the base structure. The one or more hooks are configured for being folded between a retracted position and an extended position. The foldable arrangement is preventing the hooks from being attached to items when not being used or when arranged in the storage position.

According to an aspect of the disclosure, the base structure is movably connected to the attachment post, and the base structure is at least in the in-use position configured for being positioned in two or more positions in a longitudinal direction of the attachment post. The movable connection is providing a simple structure that is possible to adapt in relation to the type of objects attached to the hook structure. The solution is thus flexible and can be adjusted for example in relation to the size of a grocery bag.

According to another aspect of the disclosure, the system further comprises an electric motor and an actuating unit connected to the base structure. The electric motor and the actuating unit are configured for moving the base structure in the longitudinal direction along the attachment post. The electric motor and the actuating unit can be used for moving the base structure in a desired position in relation to the attachment post. The electric motor is driving the actuating unit and the actuating unit can be used for moving the base structure.

According to a further aspect of the disclosure, the system further comprises a sensor unit, and the sensor unit is configured for detecting a weight load on the one or more hooks. The sensor unit is providing a way to balance the system depending of a weight load of one or more objects attached to the attachment system. When objects, such as grocery bags are attached to the hook structure, the base structure can for example be moved from a low position of the attachment post in a position upwards along the attachment post until the grocery bags are hanging down from the hook structure towards a floor of the luggage compartment for a secure transportation. The sensor unit may be used for sensing the correct position of the base structure in relation to the attachment post.

According to an aspect of the disclosure, the base structure comprises a locking device, where the locking device is configured for releasably locking the base structure to the attachment post. The locking device is securing the base structure in relation to the attachment post, and the locking device can be released for moving the base structure into a desired position in relation to the attachment post.

According to another aspect of the disclosure, the locking device comprises a lever arm and a locking member. The locking member is configured for being in locking engagement with the attachment post, and the lever arm is configured for positioning the locking member between a locked position and an unlocked position. The lever arm is connected to the locking member for engaging and disengaging the locking member in relation to the attachment post. When engaged, the base structure is locked to the attachment post with the locking member. When disengaged, the locking member is not locking the base structure to the attachment post, and the base structure can be moved in relation to the attachment post to a desired position.

According to a further aspect of the disclosure, a second end of the attachment post is in the in-use position configured to be attached to a second vehicle interior structure. The second end of the attachment post comprises a connection member, where the connection member in the in-use position is configured for being attached to the second vehicle interior structure. The second vehicle interior structure is a part of the vehicle interior suitable for receiving the second end of the attachment post in the in-use position, such as for example a ceiling structure to which the connection member can be attached. The ceiling structure may be arranged with a suitable receiving member for holding the connection member in position.

According to another aspect of the disclosure, the first end of the attachment post comprises a hinged connection member. The hinged connection member is movably connected to the elongated guide member and configured for sliding along the elongated guide member between the storage position and the in-use position. The hinged connection member is connecting the attachment post and the elongated guide member, and the hinged connection member is arranged to slide along the elongated guide member for positioning the attachment post. The hinge is allowing the attachment post to be positioned in different angles in relation to the elongated guide member, for example between an essentially parallel orientation in the storage position and an essentially perpendicular orientation when used.

According to a further aspect of the disclosure, the hinged connection member is configured for sliding along the elongated guide member from a first end section of the elongated guide member in a direction towards a second end section of the elongated guide member when the attachment post is moved from the storage position to the in-use position; or the hinged connection member is configured for sliding along the elongated guide member from the second end section of the elongated guide member in a direction towards the first end section of the elongated guide member when the attachment post is moved from the in-use position to the storage position. The slidingly arranged hinged connection member is thus moving between the end sections of the elongated guide member for a simple and efficient positioning of the attachment post between the storage position and the in-use position.

According to an aspect of the disclosure, the system further comprises a movable cargo floor structure, and the attachment post and the hook structure are in the storage position arranged in a storage compartment below the movable cargo floor structure. The arrangement of the attachment post and the hook structure below the movable cargo floor is establishing an efficient storage position, where the attachment post and the hook structure are not interfering with other luggage compartment structures or objects.

According to another aspect of the disclosure, the movable cargo floor structure comprises a recess, where the recess is configured to be arranged at least partly around the attachment post in the in-use position. The recess is configured for preventing movement of the attachment post in relation to the elongated guide member. The recess is holding the attachment post in position in relation to the elongated guide member and the cargo floor structure. The recess is also providing an efficient and simple arrangement for positioning the attachment post in a desired in-use position and is securing the attachment post in relation to the cargo floor structure.

The disclosure further concerns a vehicle comprising a foldable attachment system according to the descriptions above, where the vehicle comprises a first vehicle interior structure and a second vehicle interior structure. The first vehicle interior structure is for example a luggage compartment floor structure, and the second vehicle interior structure is for example an interior ceiling structure.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
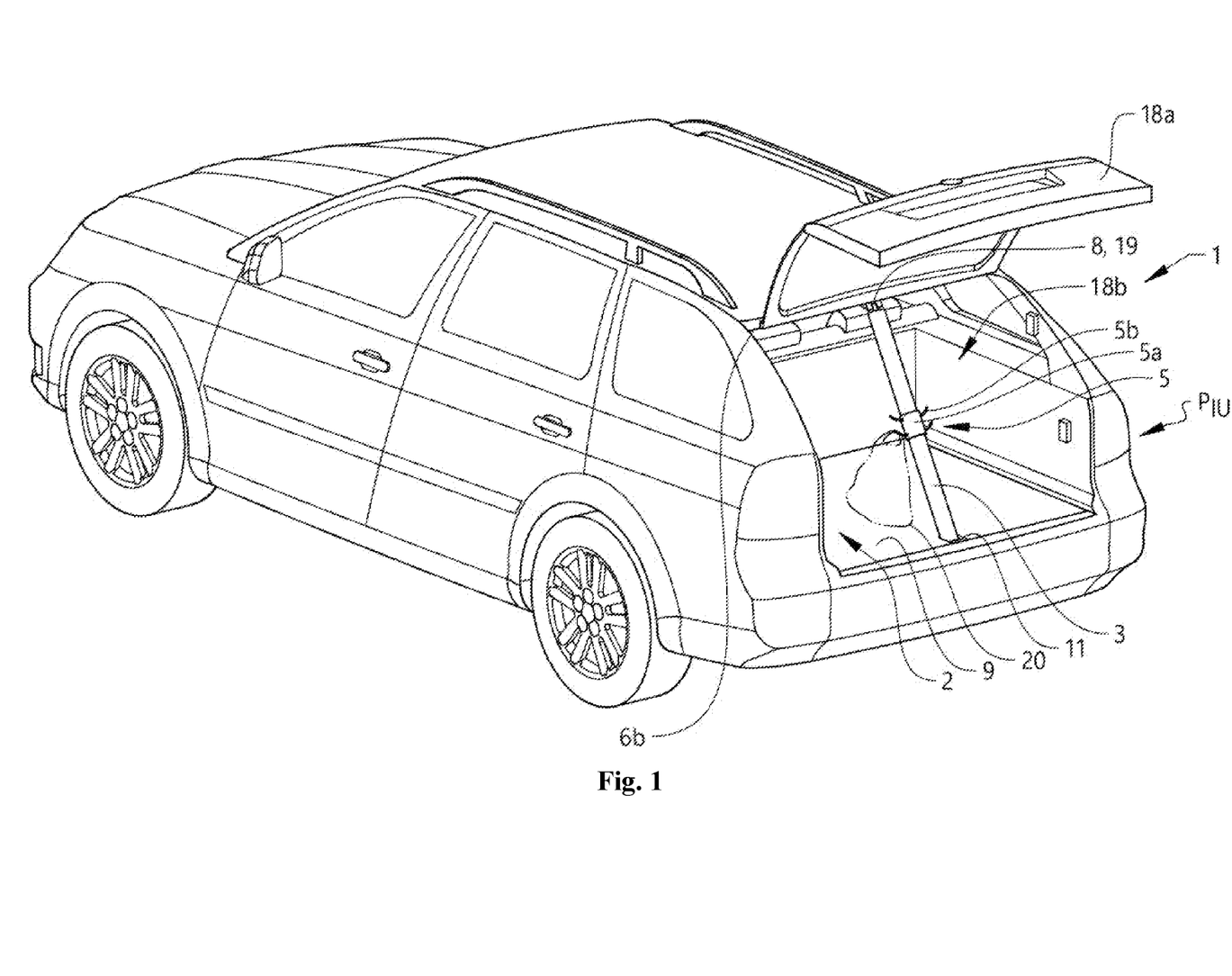
FIG. 1 shows schematically in a perspective view, a vehicle with a foldable attachment system according to the disclosure.

FIG. 1 schematically shows a foldable attachment system 1 according to the disclosure. The foldable attachment system 1 is arranged for holding one or more objects 20, such as for example grocery bags and other types of bags or storage devices, within an interior vehicle luggage compartment 2 of a vehicle. The shown foldable attachment system 1 is suitable when transporting the objects 20 in the luggage compartment 2 for increased convenience and safety during transport. The attachment system 1 are providing a way to prevent the objects 20 from tipping over when stored and transported in the luggage compartment of the vehicle, as will be further described below.

The vehicle shown in FIG. 1 comprises a tailgate 18a and a tailgate opening 18b for accessing the luggage compartment 2. The construction and design of the luggage compartment 2 may vary depending on the design of the vehicle and the foldable attachment system 1 is suitably arranged in a SUV, station wagon, or hatchback type of vehicle. It may also be possible to arrange the foldable attachment system 1 in other vehicle types, such as for example vans or sedans. The vehicle has a longitudinal direction DL and a transverse direction DT as indicated in FIGS. 2B-2D.

Figure 2A:
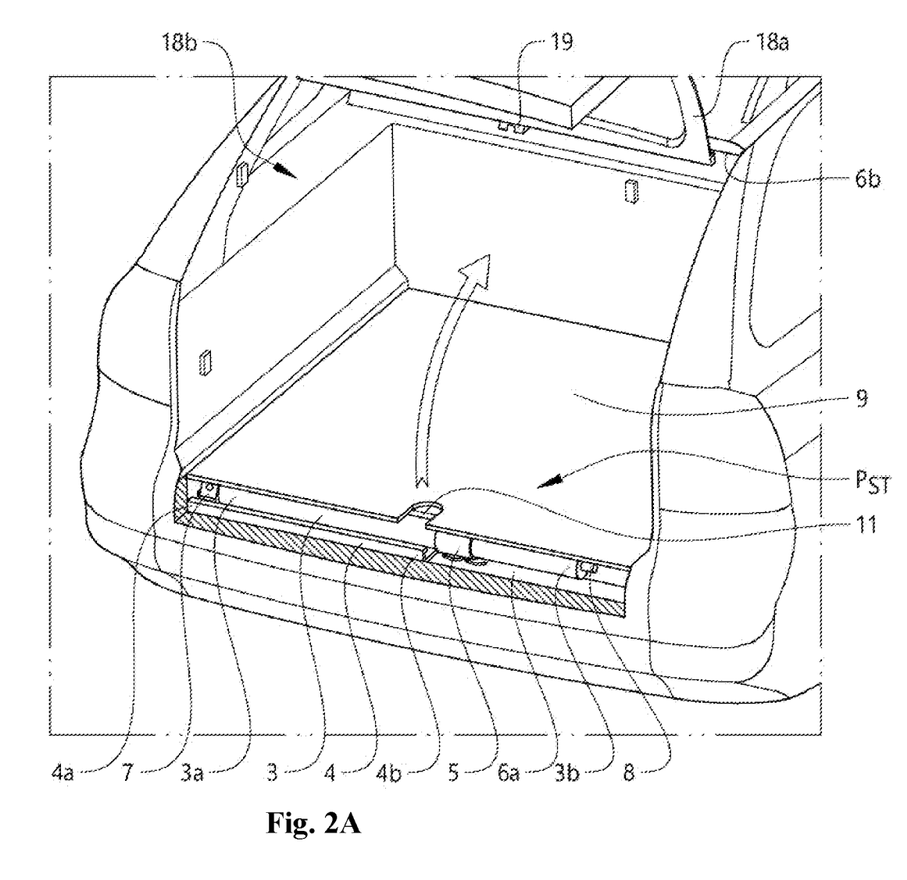
FIG. 2A-2D show schematically in perspective views, the foldable attachment system in a storage position, intermediate positions, and an in-use position according to the disclosure.
Figure 2B:
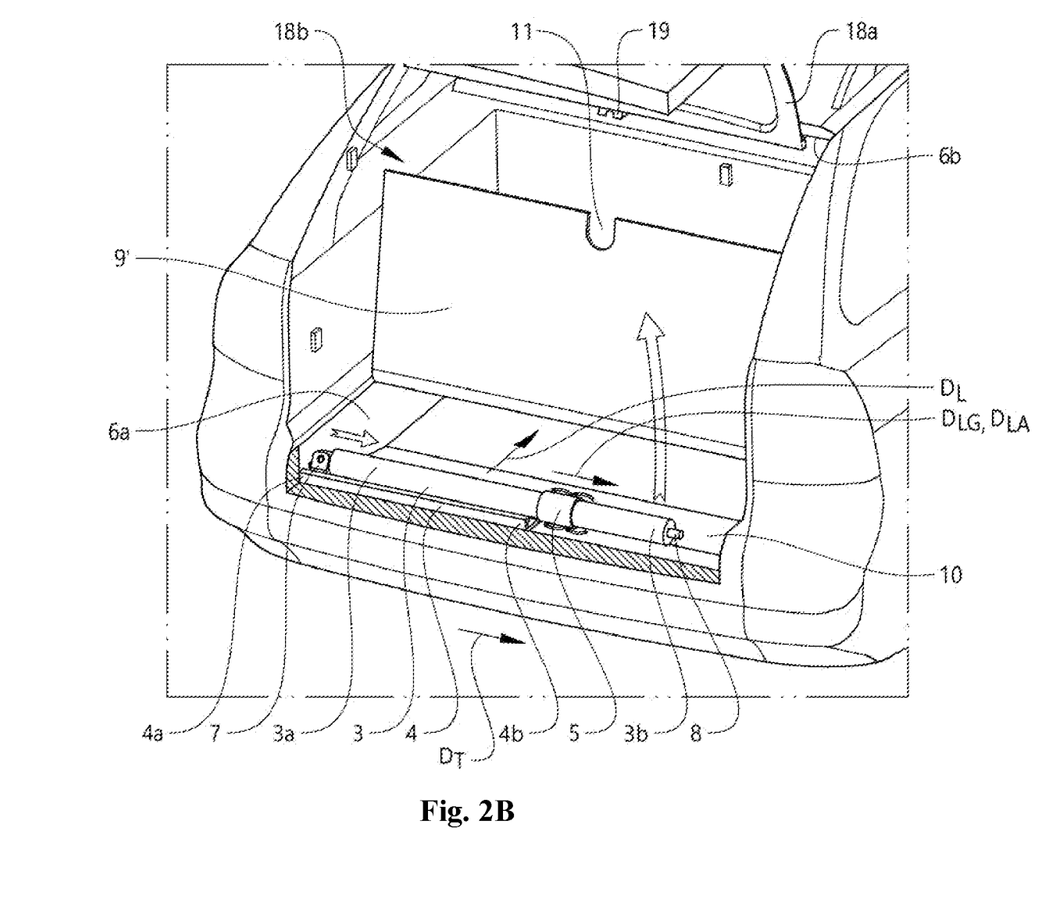
Figure 2C:
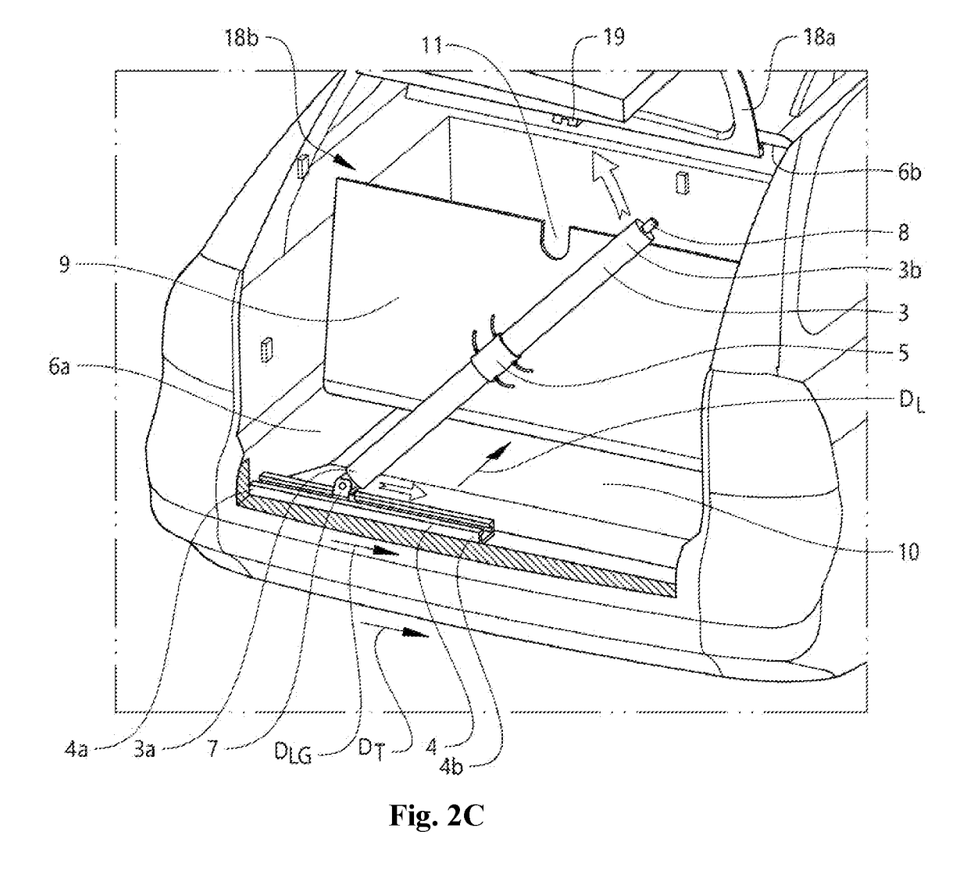
Figure 2D:
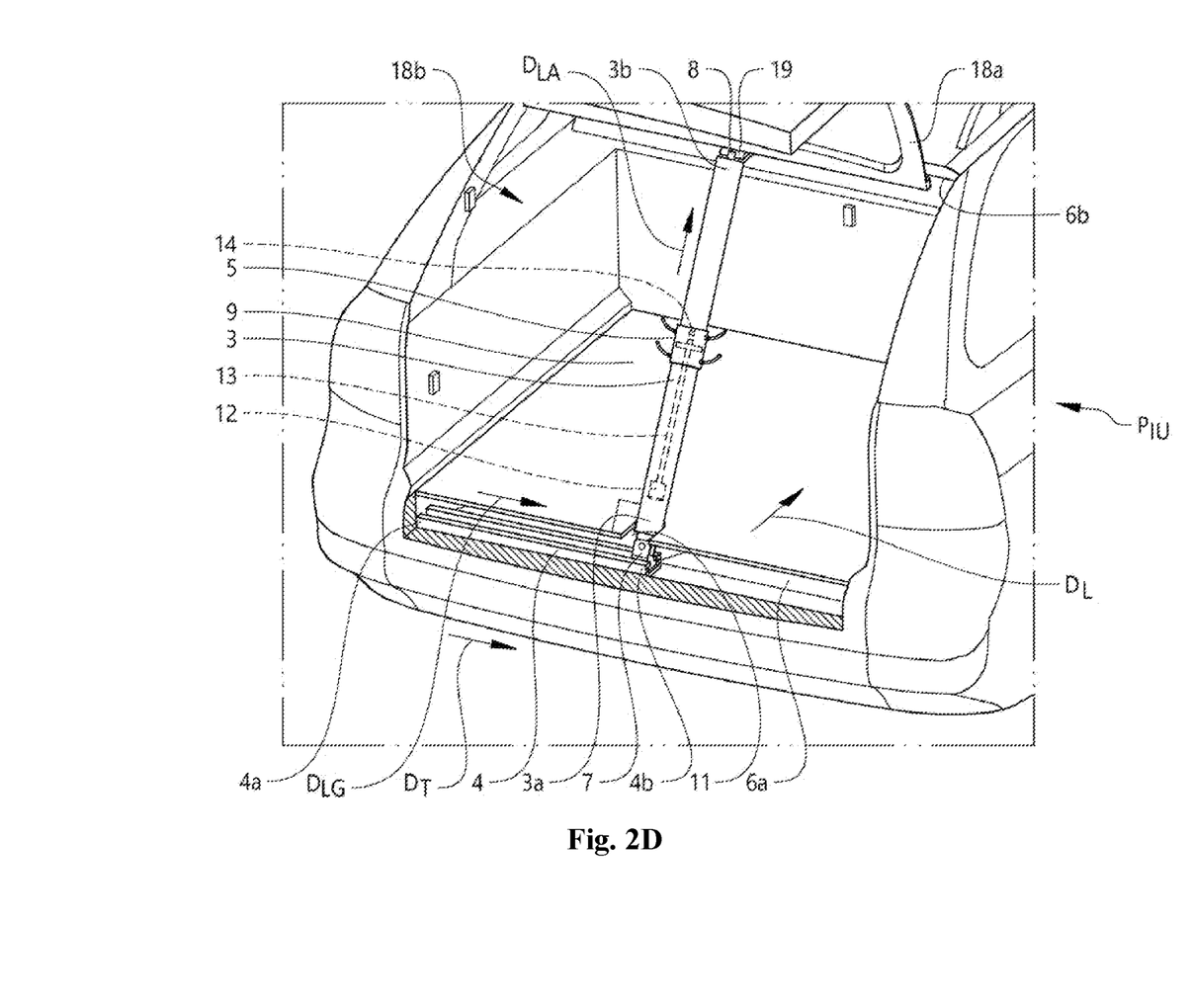

As illustrated in FIGS. 1 and 2A-2D, the foldable attachment system 1 comprises an attachment post 3, an elongated guide member 4, and a hook structure 5. In FIG. 1, the elongated guide member 4 of the attachment system 1 is arranged below a movable cargo floor structure 9 of the vehicle. Movable cargo floor structures are commonly used in vehicle applications as an upper floor structure of the luggage compartment 2, and a storage area or a spare wheel may for example be arranged on a lower floor structure of the luggage compartment 2 below the movable cargo floor structure 9. When the movable cargo floor structure 9 is in an open position, as shown in FIGS. 2B-2C, a user may have access to the area below the movable cargo floor structure 9, and in a lowered closed position, as shown in FIGS. 2A and 2D, the movable cargo floor structure 9 is arranged for holding articles or goods transported in the vehicle. The movable cargo floor structure 9 may be suitably hinged at a front section or mid-section for pivotal movement between the open position and the closed position.

The foldable attachment system 1 further comprises a hook structure 5 connected to the attachment post 3. A first end 3a of the attachment post 3 is slidingly and hingedly connected to the elongated guide member 4, as illustrated in FIGS. 2A-2D. With this connection between the attachment post 3 and the elongated guide member 4, the first end 3a of the attachment post 3 is arranged to slide along the elongated guide member 4 between different positions. Further, the attachment post 3 is arranged to be pivoted in relation to the elongated guide member 4 through the hinged connection, as will be further described below.

The elongated guide member 4 is configured to be connected to a first vehicle interior structure 6a. The elongated guide member 4 may for example be attached to the first vehicle interior structure 6a with suitable brackets and fastening elements. The first vehicle interior structure 6a may be any suitable structure, and in the embodiment shown in FIGS. 2A-2D, the first vehicle interior structure 6a is an interior luggage compartment lower floor structure. The attachment post 3 and the hook structure 5 are movably arranged in relation to the elongated guide member 4 between a storage position $P_{ST}$, as illustrated in FIG. 2A, and an in-use position $P_{IU}$, as illustrated in FIG. 2D. In FIGS. 2B-2C, the attachment post 3 with the hook structure 5 is arranged in intermediate positions between the storage position $P_{ST}$ and the in-use position $P_{IU}$.

As described above, the vehicle comprises the first vehicle interior structure 6a. The vehicle may further comprise a second vehicle interior structure 6b to which the foldable attachment system 1 is attached.

A second end 3b of the attachment post 3 may in the in-use position $P_{IU}$ be configured to be attached to the second vehicle interior structure 6b. The second vehicle interior structure 6b may be any suitable structure, and in the embodiment shown in FIGS. 1 and 2A-2D, the second vehicle interior structure 6b is an interior ceiling structure. The second vehicle interior structure 6b may be arranged with a suitable receiving member 19 for holding the second end 3b of the attachment post 3 in position in relation to the second vehicle interior structure 6b. It should be understood that in alternative embodiments, the second end 3b of the attachment post 3 may be arranged as an unattached part of the attachment system 1. Thus, if desired, the second end 3b may be arranged as a free end, which is not attached to any interior structure of the vehicle. With this configuration, the attachment post 3 is attached to the elongated guide member 4, and in the in-use position $P_{IU}$ the attachment post 3 may be configured as a standing post in a similar way to the embodiment illustrated in FIG. 1, but without the connection to the second vehicle interior structure 6b.

As illustrated in FIG. 2B, a longitudinal direction $D_{LA}$ of the attachment post 3 is in the storage position $P_{ST}$ arranged in parallel with, or substantially in parallel with, a longitudinal direction $D_{LG}$ of the elongated guide member 4. The parallel arrangement is providing a compact configuration for storing the attachment system 1. As illustrated in FIG. 2D, the longitudinal direction $D_{LA}$ of the attachment post 3 is in the in-use position $P_{IU}$ arranged perpendicular to, or substantially perpendicular to, the longitudinal direction $D_{LG}$ of the elongated guide member 4. The attachment post 3 is in the in-use position $P_{IU}$ arranged substantially perpendicular to a longitudinal direction $D_{LG}$ of the elongated guide member 4, and in the in-use position $P_{IU}$, the attachment post 3 is in a position where the hook structure 5 can be used for holding the objects 20.

Figure 4A:
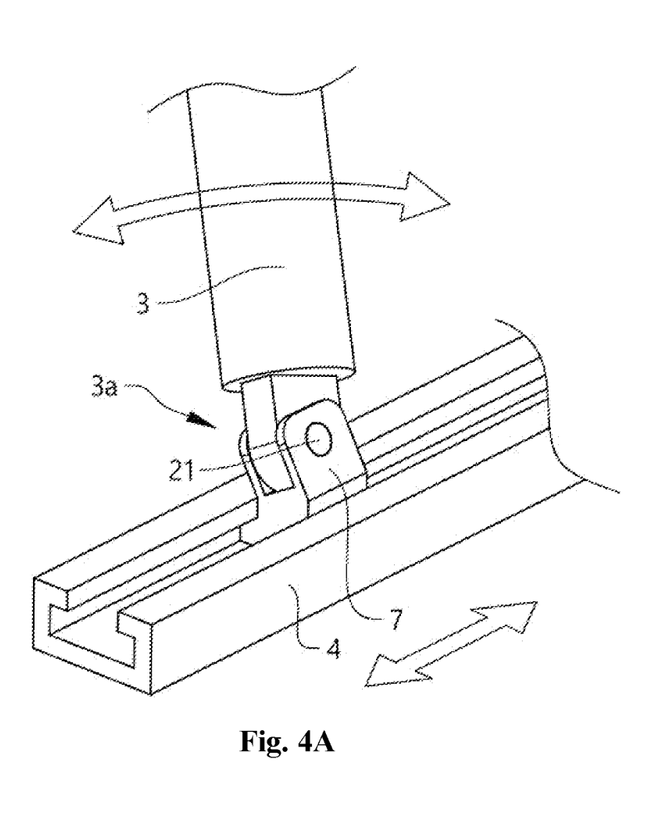
FIG. 4A-4B show schematically in perspective views, alternative embodiments of an elongated guide member with a hinged connection member of the foldable attachment system according to the disclosure.
Figure 4B:
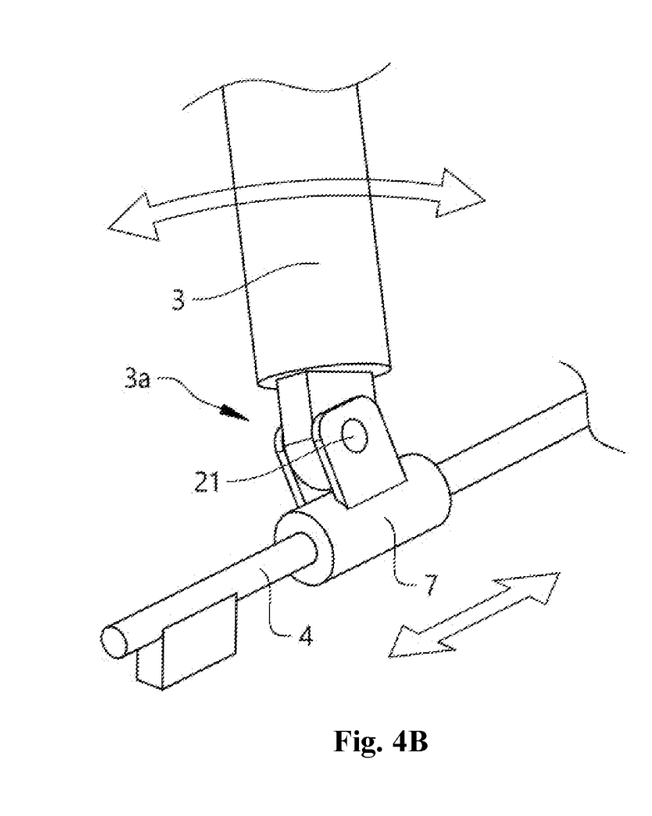

As shown in FIGS. 4A-4B, the first end 3a of the attachment post 3 comprises a hinged connection member 7, and the hinged connection member 7 is movably connected to the elongated guide member 4. The hinged connection member 7 is thus connecting the attachment post 3 via the first end 3a to the elongated guide member 4. The hinged connection member 7 is arranged with a hinge axis 21, about which the attachment post 3 may pivot in relation to the elongated guide member 4, as will be further described below. The hinged connection member 7 is further arranged to slide along the elongated guide member 4 between the storage position $P_{ST}$ and the in-use position $P_{IU}$. The hinged connection member 7 may for example be arranged as an axle, around which the attachment post 3 is pivoting. Other suitable pivoting or hinge-like configurations of the hinged connection member 7 are possible as alternatives to the illustrated embodiments if FIGS. 4A-4B.

As illustrated in FIGS. 2A-2D, the elongated guide member 4 comprises a first end section 4a and a second end section 4b. The hinged connection member 7 is arranged to slide along the elongated guide member 4 from the first end section 4a of the elongated guide member 4 in a direction towards the second end section 4b of the elongated guide member 4 when the attachment post 3 is moved from the storage position $P_{ST}$ to the in-use position $P_{IU}$, as indicated with arrows in FIGS. 2B-2C. In a similar way, the hinged connection member 7 is arranged to slide along the elongated guide member 4 from the second end section 4b of the elongated guide member 4 in a direction towards the first end section 4a of the elongated guide member 4 when the attachment post 3 is moved from the in-use position $P_{IU}$ to the storage position $P_{ST}$. Further, through the hinged connection member 7, the attachment post 3 can be pivoted in relation to the elongated guide member 4. In the in-use position $P_{IU}$ the attachment post 3 is arranged in an upright configuration, and in the storage position $P_{ST}$ the attachment post 3 is arranged in a folded configuration, as shown in FIGS. 2A-2D. Thus, the pivoting function is allowing the attachment post 3 to be pivoted between the parallel, or substantially parallel, configuration to the longitudinal direction $D_{LG}$ of the elongated guide member 4 in the storage position $P_{ST}$, and the perpendicular, or substantially perpendicular, configuration to the longitudinal direction $D_{LG}$ of the elongated guide member 4 in the in-use position $P_{IU}$.

In an example embodiment, the elongated guide member 4 may be arranged as an elongated rod structure to which the hinged connection member 7 is slidingly attached. The hinged connection member 7 may, as shown in FIG. 4B, be designed as a sleeve structure encompassing the rod structure, where the sleeve structure is arranged to slide along the rod structure. The attachment post 3 may be pivotally attached to the sleeve structure at the first end 3a with a hinged part having the hinge axis 21 about which the attachment post 3 may pivot in relation to the elongated guide member 4. In an alternative embodiment, the elongated guide member 4 may be arranged as an elongated track structure to which the hinged connection member 7 is slidingly attached. The hinged connection member 7 may, as shown in FIG. 4A, be designed as a sliding member arranged in the track structure, where the sliding member is arranged to slide along the track structure. The attachment post 3 may be pivotally attached to the sleeve structure at the first end 3a with a hinged part having the hinge axis 21 about which the attachment post 3 may pivot in relation to the elongated guide member 4. The elongated guide member 4 and/or the hinged connection member 7 may if desired be provided with fastening means or similar arrangements for releasably positioning the hinged connection member 7 in relation to the elongated guide member 4.

The second end 3b of the attachment post 3 may comprise a connection member 8, and the connection member 8 in the in-use position $P_{IU}$ is configured to be attached to the second vehicle interior structure 6b. As described above, the second vehicle interior structure 6b may be arranged with the receiving member 19 for holding the second end 3b of the attachment post 3 in position in relation to the second vehicle interior structure 6b. The receiving member 19 and the connection member 8 may be arranged to interact with each other for holding the attachment post 3 in position in relation to the second vehicle interior structure 6b. As an example, the connection member 8 may be a shaped structural end part of the second end 3b of the attachment post 3 arranged to be releasably connected to the receiving member 19. The receiving member 19 and/or the connection member 8 may suitably be provided with snap fasteners or similar arrangements for holding the attachment post 3 in position in relation to the second vehicle interior structure 6b.

The foldable attachment system 1 may further comprise the movable cargo floor structure 9. The movable cargo floor structure 9 may be hinged at a front section or mid-section for pivotal movement between the open position and the closed position, as described above and illustrated in FIGS. 2A-2D. A storage compartment 10 may be arranged below the movable cargo floor structure 9, as shown in FIGS. 2B-2C. The attachment post 3 and the hook structure 5 can in the storage position $P_{ST}$ be arranged in the storage compartment 10 below the movable cargo floor structure 9. With this arrangement, the attachment post 3 and the hook structure 5 can conveniently be hidden below the movable cargo floor structure 9 when the attachment system 1 is not used, as shown in FIG. 2A.

The movable cargo floor structure 9 may comprise a recess 11, as illustrated in FIGS. 1 and 2A-2D, where the recess 11 is configured to be arranged at least partly around the attachment post 3 in the in-use position $P_{IU}$. The recess 11 may have a shape similar to the cross-sectional shape of the attachment post 3, where the recess 11 is locking the attachment post 3 and preventing movement of the attachment post 3 in relation to the elongated guide member 4 in the in-use position $P_{IU}$, as will be further described below. The recess 11 may if desired be covered with a lid, flexible sheet of material, or other suitable structure in the storage position $P_{ST}$.

As described above, the vehicle comprises the first vehicle interior structure 6a, and the second vehicle interior structure 6b. The foldable attachment system 1 may be arranged in different positions of the vehicle. A suitable positioning of the system is shown in the example embodiment in the figures, where the first vehicle interior structure 6a is a luggage compartment floor structure. The elongated guide member 4 is in this embodiment attached to the luggage compartment floor structure arranged below the movable cargo floor structure 9. The second vehicle interior structure 6b is in this embodiment an interior ceiling structure comprising the receiving member 19. The interior ceiling structure is in the shown embodiment a part of the interior vehicle ceiling arranged at a rear part of the vehicle above the luggage compartment floor structure and the movable cargo floor structure 9.

To operate the foldable attachment system 1, a user of the vehicle may first open the tailgate 18a from a closed position to the open position illustrated in FIG. 1, to have access to the luggage compartment 2 via the tailgate opening 18b. Thereafter, the movable cargo floor structure 9 is moved from the lowered closed position to the open position for the user to have access to the storage compartment 10 below the movable cargo floor structure 9 where the foldable attachment system 1 is arranged with the attachment post 3 in the stored position $P_{ST}$, as illustrated in FIGS. 2A-2B. The attachment post 3 is then pivoted in relation to the elongated guide member 4 via the hinged connection member 7 from the storage position $P_{ST}$ and simultaneously or thereafter moved in a sliding motion along the elongated guide member 4, where the hinged connection member 7 is sliding along the elongated guide member 4 from the first end section 4a of the elongated guide member 4 in a direction towards the second end section 4b of the elongated guide member 4, as illustrated in FIGS. 2B-2C. When the hinged connection member 7 has reached a position close to the second end section 4b, the attachment post 3 is raised into the in-use position $P_{IU}$ and connected to the receiving member 19 of the second vehicle interior structure 6b, together with lowering the movable cargo floor structure 9 into the closed position, as shown in FIG. 2D. The recess 11 is encompassing and locking the attachment post 3 when the movable cargo floor structure 9 is arranged in the closed position preventing the attachment post 3 from moving along the elongated guide member 4, as shown in FIGS. 1 and 2D. When the attachment post 3 is secured in the in-use position $P_{IU}$ with the recess 11 and the receiving member 19, the respective one or more hooks 5b can be used for holding one or more objects, such as for example grocery bags.

To remove the foldable attachment system 1, the system is operated in the reverse order. The movable cargo floor structure 9 is moved into the open position, and the attachment post 3 is moved and pivoted in relation to the elongated guide member 4 from the in-use position $P_{IU}$ to the storage position $P_{ST}$, wherein the attachment post 3 is pivoted in relation to the elongated guide member 4 via the hinged connection member 7 and the hinged connection member 7 is sliding along the elongated guide member 4 from the second end section 4b of the elongated guide member 4 in a direction towards the first end section 4a of the elongated guide member 4. The movable cargo floor structure 9 is moved to the closed position when the attachment post 3 is arranged in the storage position $P_{ST}$.

Further, it would be possible to arrange the attachment post 3 detachable from the elongated guide member 4, wherein the attachment post 3 can be stored in alternative positions in the vehicle.

The hook structure 5 comprises a base structure 5*a* and one or more hooks 5*b* arranged on the base structure 5*a*. In the embodiments illustrated in FIGS. 1 and 3A-3E, the hook structure 5 comprises the base structure 5*a* and four hooks 5*b* arranged on the base structure 5*a*. However, any suitable number of hooks may be used if desired. The hooks 5*b* are used for holding the grocery bags or other objects, and the handles of the grocery bags may conveniently be attached to the hooks. The user of the system may simply hang the grocery bags or other objects on the hooks 5*b*. The hooks 5*b* may have any suitable configuration or design, and it may be possible to use carabiners or carabiner-like hooks if desired. Other types of lockable hooks may also be used if desired. The base structure 5*a* may be non-movably connected to the attachment post 3 at a suitable position along the attachment post 3, or alternatively movably connected to the attachment post 3, as will be further described below. The hook structure 5 is via the hooks 5*b* securely holding the objects during transport and the base structure 5*a* is used for holding the one or more hooks 5*b* in relation to the attachment post 3.

Figure 3A:
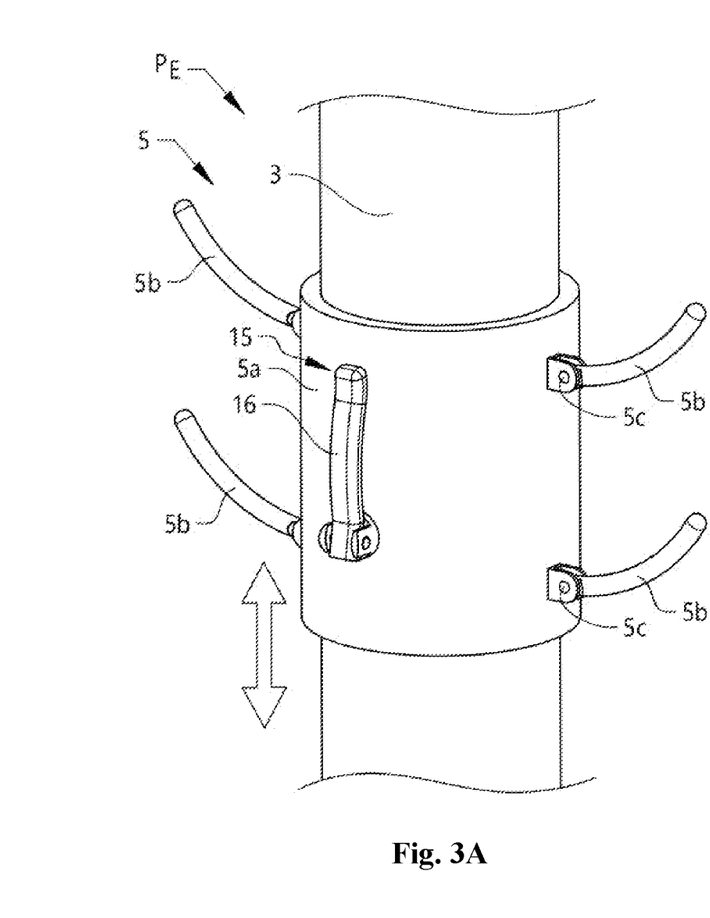
FIG. 3A-3E show schematically in perspective and cross-sectional views, different embodiments of a hook structure of the foldable attachment system according to the disclosure.
Figure 3B:
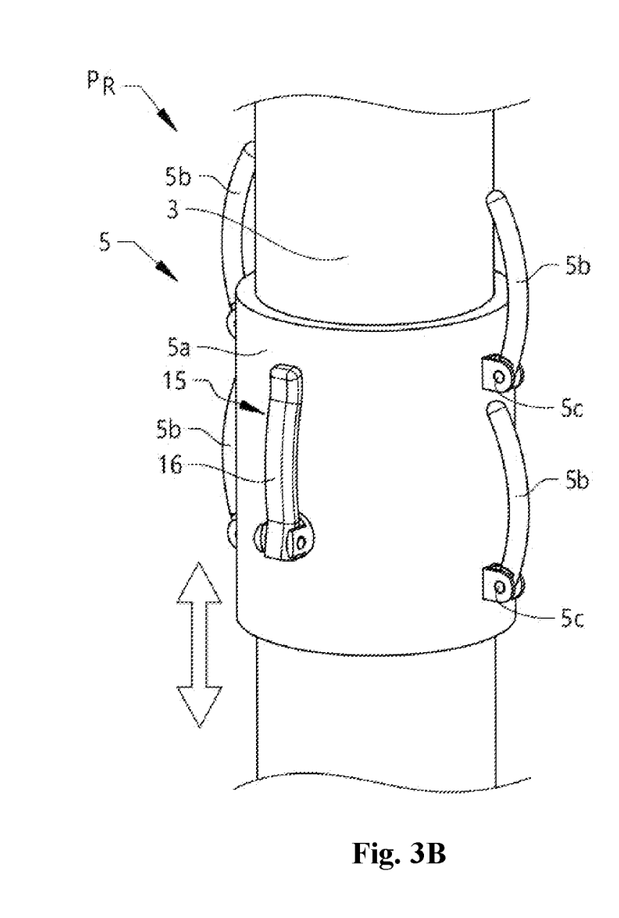
Figure 3C:
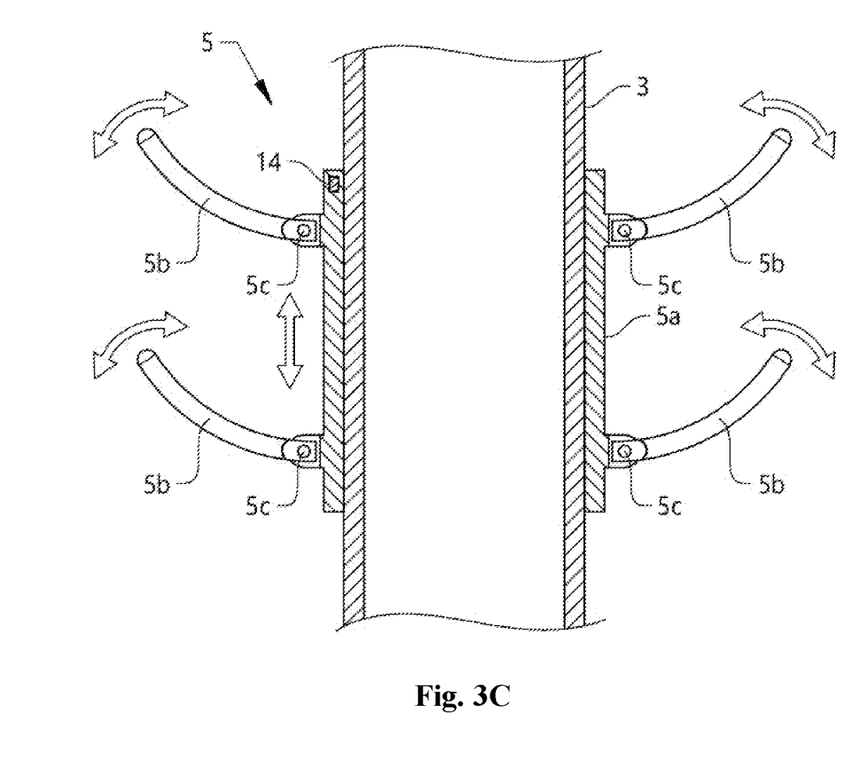

The one or more hooks 5*b* may be foldably arranged on the base structure 5*a*, as shown in FIGS. 3A-3C and illustrated with arrows in FIG. 3C. The one or more hooks 5*b* are configured for being folded between an extended position PE, as shown in FIG. 3A, and a retracted position PR, as shown in FIG. 3B. In the extended position PE the hooks 5*b* are configured for holding the objects 20, and in the extended position PE the hooks 5*b* are folded out from the base structure 5*a* for easy access, as shown in FIG. 3A. In the retracted position PR, the hooks 5*b* are arranged in connection to the base structure 5*b*, and this position is for example suitable when arranging the attachment system 1 in the storage position $P_{ST}$. In the retraced position PR, the hooks 5*b* are folded towards the base structure 5*a*, as shown in FIG. 3B. The hooks 5*b* may for example be pivotably arranged in relation to the base structure 5*a* with pivoting members 5*c*, such as for example a hinge axis or similar arrangement, as schematically illustrated in FIGS. 3A-3C. Any suitable type of pivoting construction may be used for the pivoting arrangement of the hooks 5*b* in relation to the base structure 5*a*. The base structure 5*a* may have a sleeve-like configuration encompassing the attachment post 3, as schematically illustrated in the embodiments shown in the figures. The base structure 5*a* may have other suitable configurations if desired. The foldable arrangement is preventing the hooks 5*b* from being attached to items when not being used or suitable when the system is arranged in the storage position $P_{ST}$. In other embodiments, the hooks 5*b* may be non-foldably arranged in relation to the base structure 5*a*.

The base structure 5*a* together with the hooks 5*b* may, as described above, be movably connected to the attachment post 3, and the base structure 5*a* is at least in the in-use position $P_{IU}$ configured for being positioned in two or more positions in a longitudinal direction $D_{LA}$ of the attachment post 3. The movable connection of the base structure 5*a* in relation to the attachment post 3 is providing a simple structure that is possible to adapt in relation to the type of objects 20 attached to the hook structure 5. The solution is thus flexible and can be adjusted for example in relation to the size of a grocery bag. For longer bags, the base structure 5*a* with the hooks 5*b* may for example be positioned on a higher level in relation to the movable cargo floor structure 9 compared to shorter bags.

In one embodiment illustrated in FIGS. 3A-3D, the base structure 5*b* comprises a locking device 15. The locking device 15 is configured for releasably locking the base structure 5*a* to the attachment post 3. The locking device 15 is securing the base structure in relation to the attachment post, and the locking device 15 can be released for moving the base structure 5*b* into a desired position in relation to the attachment post 3.

Figure 3D:
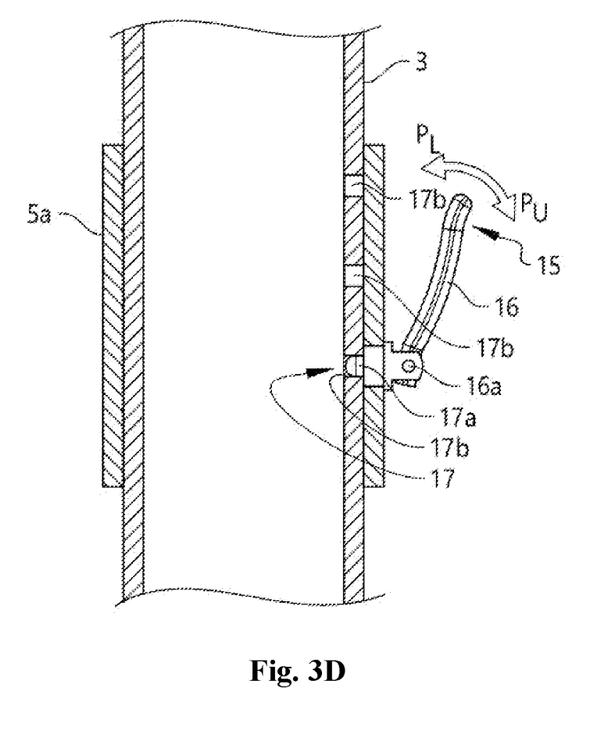

The locking device 15 may comprise a lever arm 16 and a locking member 17, as shown in FIGS. 3A-3B and 3D. The locking member 17 is configured for being in locking engagement with the attachment post 3, and the lever arm 16 is configured for positioning the locking member 17 between a locked position $P_L$ and an unlocked position $P_U$, as schematically indicated with the arrow in FIG. 3D. The lever arm 16 may be pivotally arranged in relation to the base structure 5*a* around a pivoting axis 16*a*, and the pivoting axis 16*a* may have any suitable configuration for holding the lever arm 16 pivotably connected to the base structure 5*a*. The lever arm 16 is operably connected to the locking member 17 for engaging and disengaging the locking member 17 in relation to the attachment post 3. As schematically illustrated in FIG. 3D, the locking member 17 may be provided with a locking protrusion 17*a* arranged for interacting with two or more locking recesses 17*b* arranged in the attachment post 3. The locking recesses 17*b* may for example be arranged as drilled holes, cut-outs or indentations in the attachment post 3. When engaged, the base structure 5*a* is locked to the attachment post 3 with the locking member 17 in the locked position $P_L$, and the locking protrusion 17*a* is engaging the locking recess 17*b* for connecting the base structure 5*a* to the attachment post 3. In the locked position $P_L$, the lever arm 16 may be positioned towards the base structure 5*a*. When folding the lever arm 16 out from the base structure 5*a*, the locking member 17 is released and positioned in the unlocked position $P_U$. In the unlocked position $P_U$, the locking protrusion 17*a* is disengaged from the locking recess 17*b*, and the base structure 5*a* can be moved along the attachment post 3 into a desired position. Once the base structure has reached the desired position, where the locking protrusion 17*a* is aligned with one of the locking recesses 17*b*, the lever arm 16 is folded towards the base structure 5*a* for locking the locking member 17. Thus, when disengaged, the locking member 17 is not locking the base structure 5*a* to the attachment post 3, and the base structure 5*a* can be moved in a sliding motion in relation to the attachment post 3 to a desired position.

Figure 3E:
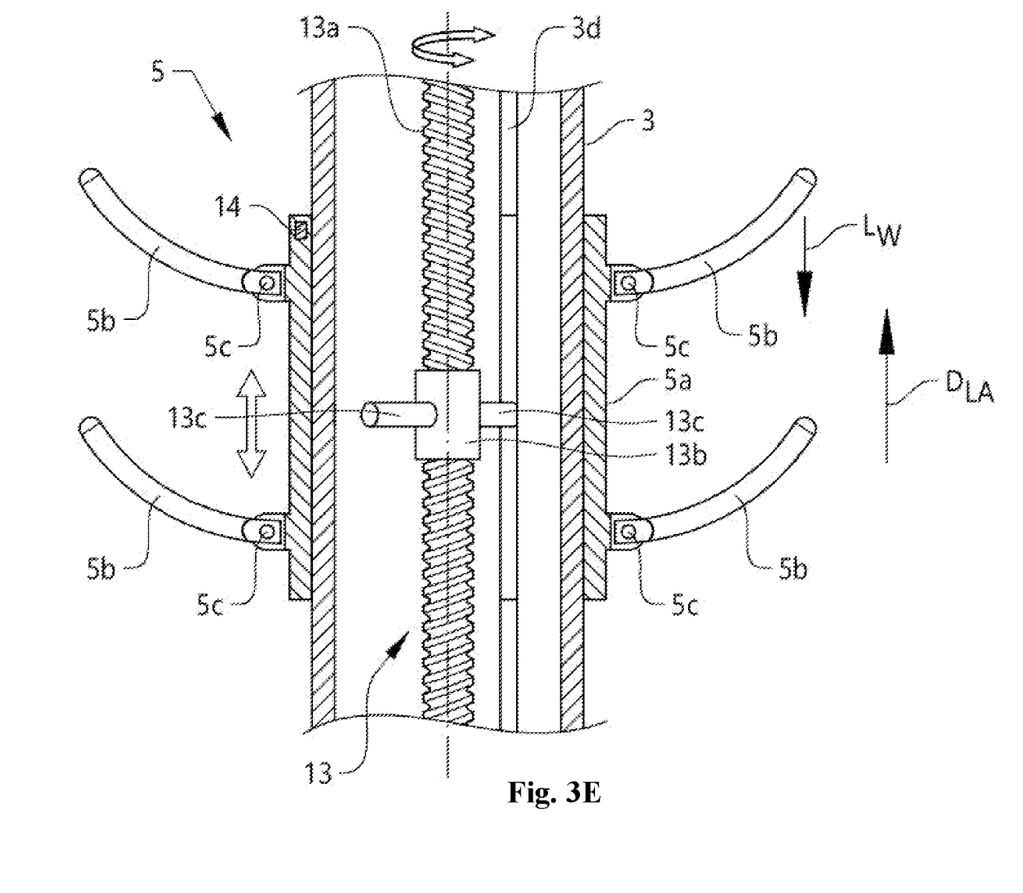

In an alternative embodiment, illustrated in FIGS. 2D and 3E, the system 1 further comprises an electric motor 12 and an actuating unit 13 connected to the base structure 5*a*. The electric motor 12 and the actuating unit 13 are configured for moving the base structure 5*a* in the longitudinal direction $D_{LA}$ along the attachment post 3. The electric motor 12 and the actuating unit 13 are moving the base structure 5*a* into desired positions in relation to the attachment post 13. The electric motor 12 is connected to and arranged for driving the actuating unit 13. The actuating unit 13 is used for moving the base structure 5*a* in relation to the attachment post 3. As illustrated in FIG. 3E, the actuating unit 13 may be arranged as a threaded rod 13*a* with a nut 13*b*, where the threaded rod 13*a* is connected to the electric motor 12. When rotating the threaded rod 13*a* with the electric motor 12, the nut 13*b* is arranged to move along the threaded rod 13*a* in the longitudinal direction $D_{LA}$ of the attachment post 3. The nut 13*b* may be moved in opposite directions depending on the rotational direction of the electric motor 12. The threaded rod 13*a*, the nut 13*b* and the electric motor 12 may be arranged inside the attachment post 3, and as illustrated in FIG. 3E the nut 13*b* is connected to the base structure 5*b*.

The attachment post 3 may for example be provided with one or more slots 3d, through which one or more connection members 13c are connecting the nut 13b and the base structure 5a. When the nut 13a is being moved, the base structure 5 is moving with the nut 13b. The electric motor 12 may be operated with a switch or similar arrangement arranged within the interior or exterior structure of the vehicle for positioning the base structure 5a into a desired position in relation to the attachment post 3. The electric motor 12 may also be remotely operated with a remote control, a vehicle key fob, or with an app in a smartphone or other suitable computer device. The electric motor 12 may be any suitable type of motor. In alternative embodiments, the actuating unit 13 may instead be arranged as a ballscrew unit, a gear actuator, a hydraulic or pneumatic cylinder, or any other type of suitable actuator.

The system 1 in the alternative embodiment illustrated in FIGS. 2D and 3E may further comprise a sensor unit 14. The sensor unit 14 is configured for detecting a weight load LW on the one or more hooks 5b or on the hook structure 5, and may be positioned in the base structure 5a as illustrated in the figures, or alternatively in the threaded rod 13a, the nut 13b or in connection to the electric motor 12. The sensor unit 14 may be any suitable type of detector for determining a weight load, such as for example a strain gauge, a load cell, or any other type of suitable sensor. The sensor unit 14 is providing a way to balance the attachment system depending of a weight load of the one or more objects 20 attached to the attachment system 1. When the objects 20, such as grocery bags, are attached to the hook structure 5, the base structure 5b can in the in-use position $P_{IU}$, for example be moved from a low position of the attachment post 3 in a position upwards along the attachment post 3 until the grocery bags are hanging down from the hook structure 5 towards the movable cargo floor structure 9 of the luggage compartment 2 for a secure transportation. The sensor unit 14 may be used for sensing the correct position of the base structure 5a in relation to the attachment post 3. As a non-limiting example, the base structure 5a may be moved in a direction upwards as long as an increasing weight load is detected by the sensor unit 14, and once the sensor unit 14 is no longer detecting an increasing weight load, the base structure is stopped.

The present disclosure has been presented above with reference to specific embodiments. However, other embodiments than the above described are possible and within the scope of the disclosure. It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1 Attachment system
2 Luggage compartment
3 Attachment post
3a First end, Attachment post
3b Second end, Attachment post
3c Slot
4 Elongated guide member
4a First end section, Elongated guide member
4b Second end section, Elongated guide member
5 Hook structure
5a Base structure
5b Hook
5c Pivoting member
6a First vehicle interior structure
6b Second vehicle interior structure
7 Hinged connection member
8 Connection member
9 Movable cargo floor structure
10 Storage compartment
11 Recess
12 Electric motor
13 Actuating unit
13a Threaded rod
13b Nut
13c Connection member
14 Sensor unit
15 Locking device
16 Lever arm
16a Pivoting axis
17 Locking member
17a Locking protrusion
17b Locking recess
18a Tailgate
18b Tailgate opening
19 Receiving member
20 Object
21 Hinge axis

What is claimed is:

1. A foldable attachment system arranged for holding objects within an interior vehicle luggage compartment, wherein the attachment system comprises an attachment post, an elongated guide member, and a hook structure, wherein the hook structure is connected to the attachment post, wherein a first end of the attachment post is slidingly and hingedly connected to the elongated guide member, and the elongated guide member is configured to be connected to a first vehicle interior structure, wherein the attachment post and the hook structure are movably arranged in relation to the elongated guide member between a storage position and an in-use position, wherein the system further comprises a movable cargo floor structure, wherein the attachment post and the hook structure in the storage position are arranged in a storage compartment below the movable cargo floor structure;

wherein the hook structure comprises a base structure and one or more hooks arranged on the base structure, and wherein the base structure is connected to the attachment post; and wherein the one or more hooks are foldably arranged on the base structure, and wherein the one or more hooks are configured for being folded between a retracted position and an extended position.

2. The foldable attachment system according to claim 1, wherein the system further comprises a sensor unit, wherein the sensor unit is configured for detecting a weight load on the one or more hooks.

3. The foldable attachment system according to claim 1, wherein a second end of the attachment post in the in-use position is configured to be attached to a second vehicle interior structure, wherein the second end of the attachment post comprises a connection member, wherein the connection member in the in-use position is configured for being attached to the second vehicle interior structure.

4. The foldable attachment system according to claim 1, wherein the attachment post in the storage position is arranged substantially in parallel with a longitudinal direction of the elongated guide member, and wherein the attachment post in the in-use position is arranged substantially perpendicular to a longitudinal direction of the elongated guide member.

5. The foldable attachment system according to claim 1, wherein the first end of the attachment post comprises a hinged connection member, wherein the hinged connection member is movably connected to the elongated guide member and configured for sliding along the elongated guide member between the storage position and the in-use position.

6. The foldable attachment system according to claim 5, wherein the hinged connection member is configured for sliding along the elongated guide member from a first end section of the elongated guide member in a direction towards a second end section of the elongated guide member when the attachment post is moved from the storage position to the in-use position, or wherein the hinged connection member is configured for sliding along the elongated guide member from the second end section of the elongated guide member in a direction towards the first end section of the elongated guide member when the attachment post is moved from the in-use position to the storage position.

7. The foldable attachment system according to claim 1, wherein the movable cargo floor structure comprises a recess, wherein the recess is configured to be arranged at least partly around the attachment post in the in-use position, wherein the recess is configured for preventing movement of the attachment post in relation to the elongated guide member.

8. A vehicle comprising a foldable attachment system according to claim 1, wherein the vehicle comprises the first vehicle interior structure and a second vehicle interior structure.

9. A foldable attachment system arranged for holding objects within an interior vehicle luggage compartment, wherein the attachment system comprises an attachment post, an elongated guide member, and a hook structure, wherein the hook structure is connected to the attachment post, wherein a first end of the attachment post is slidingly and hingedly connected to the elongated guide member, and the elongated guide member is configured to be connected to a first vehicle interior structure, wherein the attachment post and the hook structure are movably arranged in relation to the elongated guide member between a storage position and an in-use position, wherein the system further comprises a movable cargo floor structure, wherein the attachment post and the hook structure in the storage position are arranged in a storage compartment below the movable cargo floor structure;

wherein the hook structure comprises a base structure and one or more hooks arranged on the base structure, and wherein the base structure is connected to the attachment post; and wherein the base structure is movably connected to the attachment post, and wherein the base structure at least in the in-use position is configured for being positioned in two or more positions in a longitudinal direction of the attachment post.

10. The foldable attachment system according to claim 9, wherein the system further comprises an electric motor and an actuating unit connected to the base structure, wherein the electric motor and the actuating unit are configured for moving the base structure in the longitudinal direction along the attachment post.

11. A foldable attachment system arranged for holding objects within an interior vehicle luggage compartment, wherein the attachment system comprises an attachment post, an elongated guide member, and a hook structure, wherein the hook structure is connected to the attachment post, wherein a first end of the attachment post is slidingly and hingedly connected to the elongated guide member, and the elongated guide member is configured to be connected to a first vehicle interior structure, wherein the attachment post and the hook structure are movably arranged in relation to the elongated guide member between a storage position and an in-use position, wherein the system further comprises a movable cargo floor structure, wherein the attachment post and the hook structure in the storage position are arranged in a storage compartment below the movable cargo floor structure;

wherein the hook structure comprises a base structure and one or more hooks arranged on the base structure, and wherein the base structure is connected to the attachment post; and wherein the base structure comprises a locking device, wherein the locking device is configured for releasably locking the base structure to the attachment post.

12. The foldable attachment system according to claim 7, wherein the locking device comprises a lever arm and a locking member, wherein the locking member is configured for being in locking engagement with the attachment post, and wherein the lever arm is configured for positioning the locking member between a locked position and an unlocked position.

* * * * *